US010726248B2

(12) United States Patent
Nallapa et al.

(10) Patent No.: US 10,726,248 B2
(45) Date of Patent: Jul. 28, 2020

(54) VALIDATING GESTURE RECOGNITION CAPABILITIES OF AUTOMATED SYSTEMS

(71) Applicant: Ford Global Technologies, LLC, Dearborn, MI (US)

(72) Inventors: Venkatapathi Raju Nallapa, Fairfield, CA (US); Anjali Krishnamachar, Mountain View, CA (US); Gautham Sholingar, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 182 days.

(21) Appl. No.: 15/886,707

(22) Filed: Feb. 1, 2018

(65) Prior Publication Data

US 2019/0236341 A1 Aug. 1, 2019

(51) Int. Cl.
*G06K 9/00* (2006.01)
*G05D 1/02* (2020.01)

(52) U.S. Cl.
CPC ....... *G06K 9/00335* (2013.01); *G05D 1/0231* (2013.01); *G05D 1/0257* (2013.01)

(58) Field of Classification Search
CPC . G05D 1/0231; G05D 1/0257; G06K 9/00335
See application file for complete search history.

(56) References Cited

U.S. PATENT DOCUMENTS 7,340,100 B2   3/2008   Higaki
7,587,069 B2   9/2009   Movellan
(Continued)

FOREIGN PATENT DOCUMENTS

CN   104850234 A    8/2015
CN   106845430      6/2017
(Continued)

OTHER PUBLICATIONS

Mangera et al., Gesture recognition with application to human-robot interaction. Diss. University of Cape Town, 2015 (Year: 2015).*
(Continued)

*Primary Examiner* — Pinalben Patel
(74) *Attorney, Agent, or Firm* — David R. Stevens; Stevens Law Group (57) ABSTRACT

The present invention extends to methods, systems, and computer program products for validating gesture recognition capabilities of automated systems. Aspects include a gesture recognition training system that is scalable, efficient, repeatable, and accounts for permutations of physical characteristics, clothing, types of gestures, environment, culture, weather, road conditions, etc. The gesture recognition training system includes sensors and algorithms used to generate training data sets that facilitate more accurate recognition of and reaction to human gestures. A training data set can be scaled from both monitoring and recording gestures performed by a humanoid robot and performed by animated humans in a simulation environment. From a scaled training data set, autonomous devices can be trained to recognize and react to a diverse set of human gestures in varying conditions with substantially improved capabilities. Recognition capabilities of an autonomous device can be validated and (re)trained until recognition capabilities are determined to be sufficient.

19 Claims, 5 Drawing Sheets

(56) References Cited

U.S. PATENT DOCUMENTS

| | | | |
|---|---|---|---|
| 9,014,905 B1 | 4/2015 | Kretzschmar | |
| 9,159,151 B2 * | 10/2015 | Perez | H04N 21/4532 |
| 9,329,597 B2 | 5/2016 | Stoschek | |
| 9,381,426 B1 * | 7/2016 | Hughes | H04L 67/06 |
| 9,586,585 B2 | 3/2017 | Delp | |
| 2014/0258192 A1 | 9/2014 | Kim | |
| 2016/0167648 A1 * | 6/2016 | James | B60Q 1/503 |
| | | | 701/28 |
| 2017/0124407 A1 | 5/2017 | Micks | |
| 2017/0285757 A1 * | 10/2017 | Robertson | G06F 3/017 |
| 2018/0018527 A1 * | 1/2018 | Micks | G06F 17/5009 |
| 2018/0345496 A1 | 12/2018 | Li | |
| 2019/0094844 A1 * | 3/2019 | Hemken | G05B 19/42 |
| 2019/0120633 A1 * | 4/2019 | Afrouzi | G06T 7/11 |

FOREIGN PATENT DOCUMENTS

| | | |
|---|---|---|
| EP | 2767967 | 8/2012 |
| WO | WO 2019/080203 | 11/2017 |

OTHER PUBLICATIONS

Saponas et al, Demonstrating the Feasibility of Using Forearm Electromyography for Muscle-Computer Interfaces, 2008 (Year: 2008).*

* cited by examiner

VALIDATING GESTURE RECOGNITION CAPABILITIES OF AUTOMATED SYSTEMS

CROSS-REFERENCE TO RELATED APPLICATIONS

Not applicable.

BACKGROUND

1. Field of the Invention

This invention relates generally to the field of gesture recognition, and, more particularly, to validating gesture recognition capabilities of automated systems.

2. Related Art

Human-to-Human gestures are an integral component of day-to-day interactions in many different environments. Humans can use hand gestures, facial expressions, and general body language to communicate intent. Communicated intent can be environment specific. That is, the same gesture can have different meanings in different environments. For example, a gesture performed by a patient in an assisted living facility may mean something different than the same gesture performed by an athlete during a game.

In a growing number of environments, automated systems interact with humans to perform activities previously performed by humans. As such, these automated systems need to appropriately recognize and react to human gestures (similar to humans) based on environmental context.

For example, in a roadway environment, police officers, pedestrians, cyclists, and drivers can use hand gestures, facial expressions, and general body language to communicate intent with respect to safely travelling in the roadway environment. Autonomous vehicles can share the roadway environment with police officers, pedestrians, cyclists, and human operated vehicles. To maintain roadway safety, the autonomous vehicles need to recognize and react to a diverse set of human of gestures under varying conditions (e.g., weather, traffic congestion, emergency situations, etc.) with a relatively high degree of accuracy.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for validating gesture recognition capabilities of automated systems. Gesture recognition includes recognizing human gestures, such as, for example, hand gestures, facial expressions, and other body language cues.

Gesture recognition systems that use machine learning, deep-learning, or other inference techniques can be trained from data sets. The recognition capability of a gesture recognition system can depend on the quantity and quality of data used to train the gesture recognition system (as well as specifics of training methods and implementation). Training data sets can be generated by recording humans (actors) performing gestures in controlled environment settings. However, generating larger volumes of quality training data using humans can be time-consuming, expensive, and potentially unsafe (e.g., when recording on a roadway).

Thus, training data sets generated from recording humans are often inadequate as lacking both in data quality and in data quantity. For example, a data set generated from recording some human gestures may not cover other variations and nuances of the human gestures and may not address environmental conditions that occur in real life. As such, the recognition capabilities of a gesture recognition system trained from human recorded data may be insufficient for many environments, including roadways and other environments where human safety is a factor.

Aspects of the invention include a gesture recognition training system that is scalable, efficient, and can account for permutations of physical characteristics, clothing, types of gestures, environment, culture, weather, road conditions, etc. The gesture recognition training system includes a suite of sensors and algorithms used to generate more comprehensive training data sets that facilitate more accurate recognition of and reaction to human gestures. For example, autonomous vehicles and other devices can be trained to recognize and react to a diverse set of human gestures in roadway environments. Further, recognition capabilities can be validated and (re)trained until the recognition capabilities are determined to be sufficient.

In one aspect, data is collected from monitoring a humanoid robot performing a gesture. The humanoid robot can be configured with sufficient degrees of freedom to express facial gestures, hand/arm based gestures, general nodding/shaking of head (e.g., to express affirmation or disapproval), shoulder shrugs, and other body language based gestures, including combinations of different gestures expressed through different portions of the humanoid robot. The humanoid robot can be programmed to perform the gesture in various contexts. The programmed gesture can be determined from existing data about standard gestures used in a particular context (e.g., on a roadway) and can account for different cultures and regions. Some example contexts include: a person signaling his/her vehicle to open the trunk as he/she walks by the vehicle, a pedestrian signaling a car to stop or keeping moving forward at a cross walk, a police officer regulating traffic at an intersection, a cyclist signaling a turn, etc.

Programming a humanoid robot can include programming actuators to move various parts of the humanoid robot (e.g., arm, hand, neck, shoulders, etc.) to perform gestures. Sensors external to the humanoid robot can monitor the humanoid robot and collect data as gestures are performed. The sensors can include image/depth/infrared cameras, LIDAR, RADAR, ultrasound, etc.

Environmental conditions and humanoid robot characteristics can be varied. A humanoid robot can be placed in different testing areas/setups, such as, for example, parking lots, mock-ups of pedestrian crossings (e.g., cross walks), intersections, etc. The humanoid robot can perform a gesture (possibly repeatedly) in the different testing areas/setups. The sensors can collect data as the humanoid robot performs the gesture. The humanoid robot can be outfitted with appropriate uniform, clothing, and physical characteristics for the type of human (e.g., pedestrian, cyclist, driver) under consideration. For example, a reflective vest can be placed on the humanoid robot to look like a traffic cop or a helmet and cycling gear can be placed on the humanoid robot to look like a cyclist.

When performing a gesture, other sensors attached to and/or integrated into the humanoid robot can capture movements of the humanoid robot and can record data in a repeatable manner. The attached and/or integrated sensors can record position, direction, speed, and acceleration of parts of the humanoid robot before, during, and after movement by an actuator, including posture and joint positions.

Captured movements can then be used in a simulation environment to simulate additional performances of the gesture. For example, simulated humans can be animated in a gaming engine to perform a gesture based on the captured movements. The simulation can be augmented with various combinations of weather conditions, landscapes, and physical characteristics of the simulated human. Virtual sensors and sensor modules in the simulation environment can observe simulated gesture performance to generate virtual sensor data. Virtual sensors and sensor modules can simulate the functionality of real world sensors, including cameras, LIDAR sensors, Radar sensors, and ultrasound sensors, in the simulation environment.

In general, it may not be feasible (or even possible) to physically move a humanoid robot between different locations having a variety of environmental conditions. Similarly, it can be logistically difficult and/or expensive to get human actors to travel between different locations having a variety of different environments conditions. However, a simulation can simulate different environments using a variety of combinations of weather conditions, landscapes, and physical characteristics, etc., Virtual data can be captured in these simulated different environments.

For example, a humanoid robot may be geographically located in a flat environment. As such, it may be cost prohibitive (or not possible) to physically move the humanoid robot into a mountainous environment. Similarly, it can be logistically difficult and/or expensive to get a human actor to travel to the mountainous environment. However, the simulation environment can simulate an animated actor performing a gesture in a mountainous environment. As another example, the humanoid robot may be may be geographically located in a sunny environment. As such, it may be cost prohibitive (or not possible) to physically move the humanoid robot into a foggy and/or rainy environment. Likewise, it can be logistically difficult and/or expensive to get a human actor to travel to foggy and/or rainy environment. However, the simulation environment can simulate an animated actor performing a gesture in a foggy and/or rainy environment.

A training data set generator can generate a training data set from sensor data captured at external sensors (real-world sensor data) and/or virtual data from a simulation environment. Together, use of real-world sensor data and virtual data facilitate generation of more robust and diverse training data sets. A training data set can establish a set of ground truth categories for a gesture and the gesture's corresponding meaning. The training data set can be used to train a gesture recognition system using machine learning, deep-learning, or other inference techniques. When more robust and diverse training data sets are used (e.g., more diverse humanoid assisted training data sets), the gesture recognition system can be trained to more accurately classify gestures (of the humanoid robot or a human). For example, a training algorithm at the gesture recognition system can use a more robust and diverse training data set to attempt to classify a gesture performed by a humanoid robot into a category.

Recognition capabilities of a gesture recognition system can be validated and (re)trained until recognition capabilities are determined to be sufficient.

Generally, use of a humanoid robot can significantly accelerate the process of generating training data sets and training and validating gesture recognition systems. The humanoid robot can be programmed to automatically perform a gesture continuously for significant amounts of time (e.g., days or even weeks) and does not tire like a human. Automated performance of a gesture reduces man hours utilized to accumulate larger training data sets.

Figure 1:
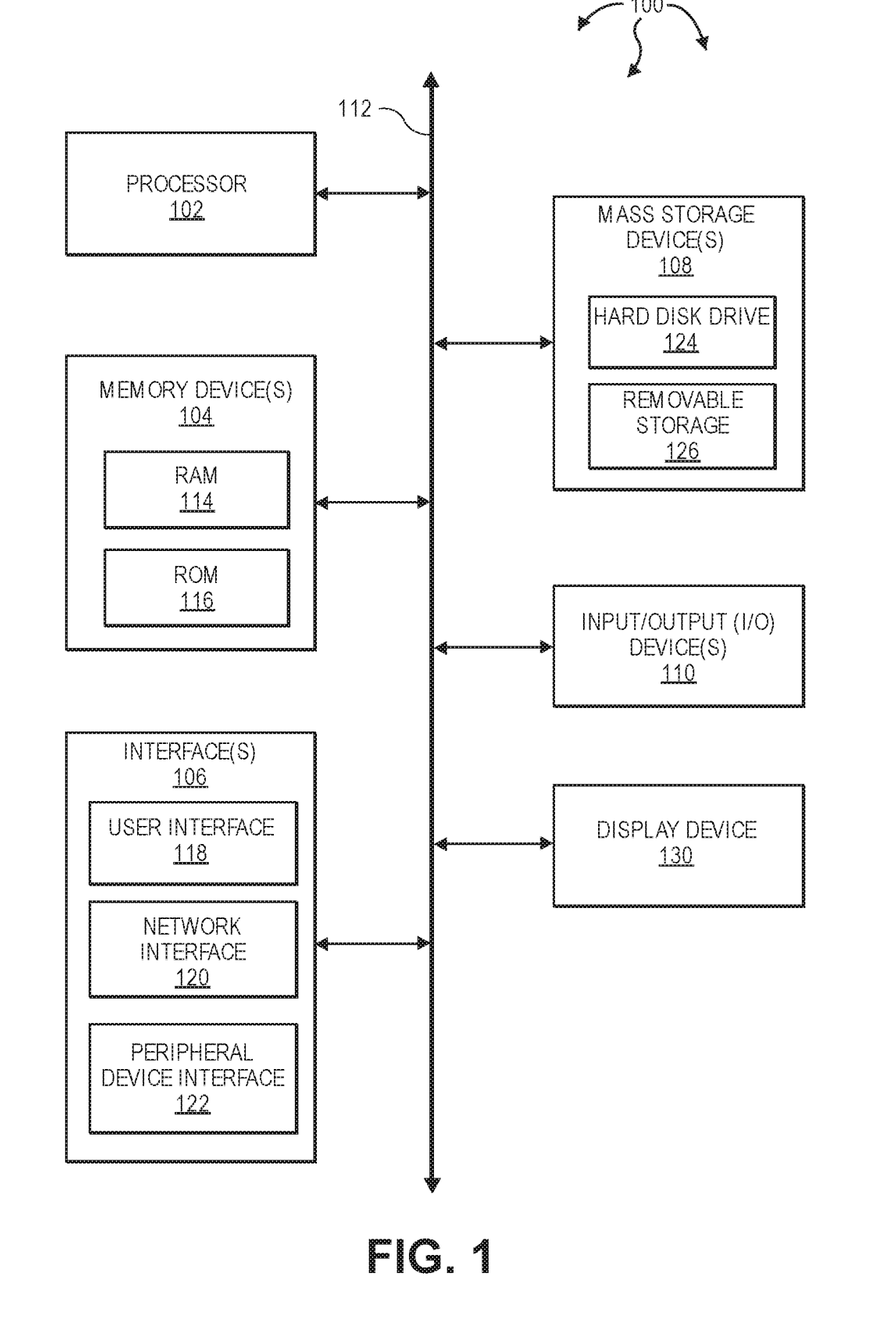
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In this description and the following claims, a "humanoid robot" is defined as a robot with its body shape built to resemble the human body. In general, humanoid robots can include a torso, a head, two arms, two legs, etc. A humanoid robot may also include two hands, two feet, and some number of finger like appendages and/or toe like appendages. However, some forms of humanoid robots may model only part of a human body, for example, from the waist up. Some humanoid robots also have heads designed to replicate human facial features such as eyes, mouths, nose, lips, ears, cheeks, etc.

Humanoid robots can use (e.g., rotary) actuators that perform like muscles and joints to facilitate movements similar to human motion. For example, actuators can be used to move the head, torso, arms, legs, hands, feet, fingers, toes, etc. Actuators can also be used to make facial features by moving eyes, nose, mouth, lips, ears, cheeks, etc. Actuators can be electric, pneumatic, hydraulic, piezoelectric, ultrasonic, etc.

Humanoid robots can also include various integrated sensors, including proprioceptive sensors and exteroceptive sensors. The sensors can be classified according to the physical process with which they work or according to the type of measurement information that they give as output. Proprioceptive sensors can sense the position, the orientation, and the speed of a humanoid robot's body parts and joints. Proprioceptive sensors can include: accelerometers to measure acceleration (from which velocity can be calculated by integration), tilt sensors to measure inclination, force sensors (e.g., in hands and feet) to measure contact force with environment, position sensors to indicate position (from which velocity can be calculated by derivation), speed sensors, gyroscopes, etc.

Exteroceptive sensors can sense stimuli external to a humanoid robot. Exteroceptive sensors can be used to simulate human touch, vision, hearing, etc. Exteroceptive sensors can include light sensors (e.g., cameras), sound sensors (e.g., microphones), temperature sensors, contact sensors, proximity sensors, etc.

A humanoid robot can also include planning and control functionality to simulate human-like movement, including legged locomotion with a biped gait. Simulating human-like movement can include stabilization on a walking surface and maintaining center of gravity over the center of bearing area for providing a stable position. Other aspects of planning and control can include self-collision detection, path planning, and obstacle avoidance.

As such, humanoid robots can move about and interact with the real world including gathering information using sensors.

In this description and the following claims, an "android" is defined as a humanoid robot built to aesthetically resemble a human.

In this description and the following claims, a "roadway gesture" is defined as a gesture used to communicate with respect to traveling on a roadway. A person or a humanoid robot can perform a roadway gesture to communicate information to another, to request that another perform an action, and/or to indicate an intent to perform an action. Roadway gestures can be performed in roadway environments and other (e.g., studio) environments to collect training data. On a roadway, a roadway gesture can be specifically directed to another person, to another humanoid robot, or to some other electronic device or can be generally directed to others in an area that can visually perceive the roadway gesture.

Figure 2:
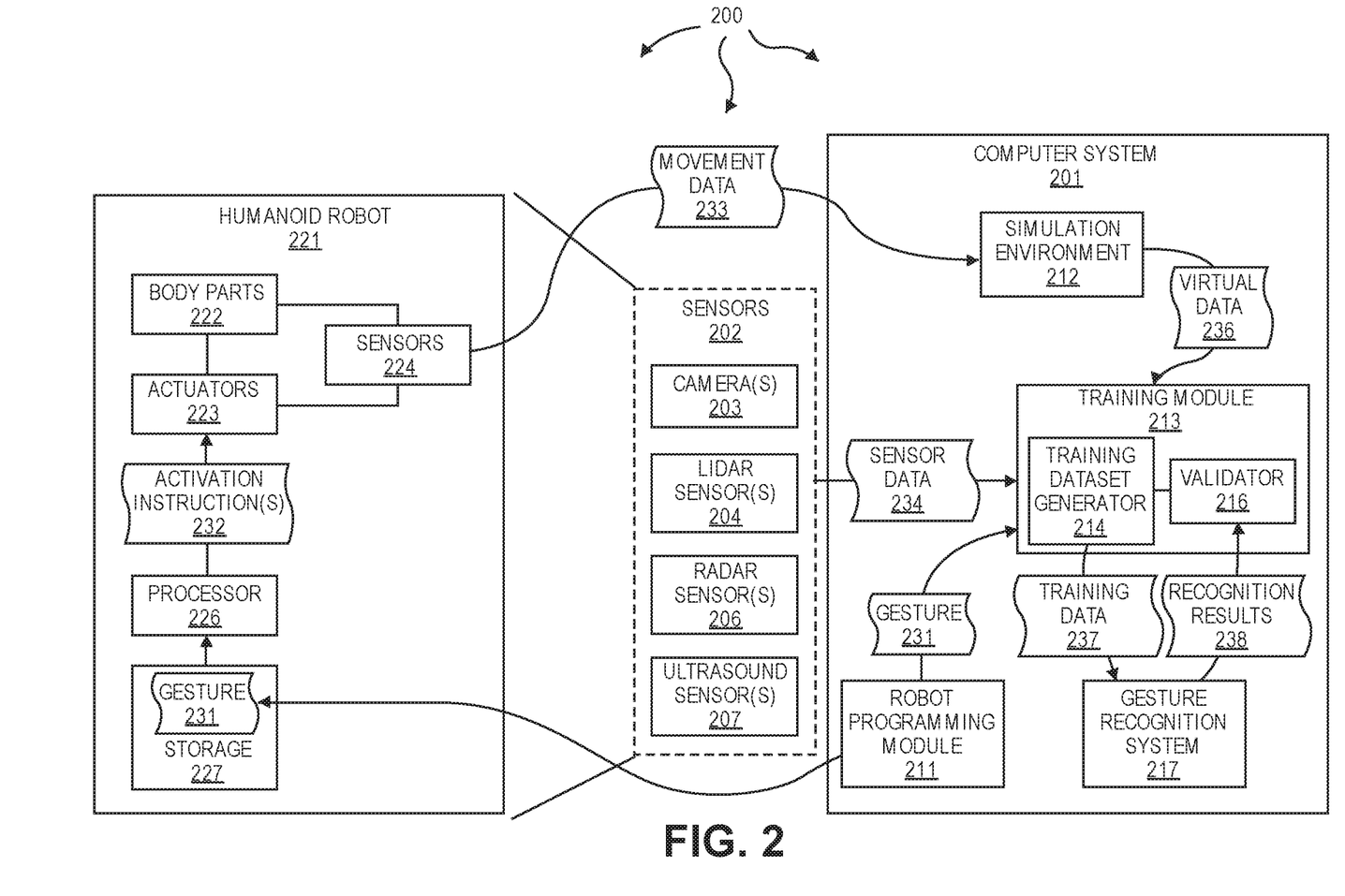
FIG. 2 illustrates an example computer architecture that facilitates validating gesture recognition capabilities of a gesture recognition system.

FIG. 2 illustrates an example computer architecture 200 that facilitates validating gesture recognition capabilities of a gesture recognition system.

As depicted, computer architecture 200 includes computer system 201, sensors 202, and humanoid robot 221. Generally, computer system 201 and humanoid robot 221 can include any of the components described with respect to computer system 100. Further, each of computer system 201, sensors 202, and humanoid robot 221, as well as their respective components can be connected to one another over (or be part of) a network, such as, for example, a PAN, a LAN, a WAN, a controller area network (CAN) bus, and even the Internet. Accordingly, each of computer system 201, sensors 202, and humanoid robot 221, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Humanoid robot 221 further includes body parts 222, actuators 223, sensors 224, processor 226, and storage 227. Actuators 223 can be actuated to move body parts 222 in accordance with programmed functionality (e.g., to perform a gesture). Sensors 224 can monitor body parts 222 and actuators 223 during movement to capture movement data, including joint and posture positions. Processor 226 can access programs and data from storage 227 that define how humanoid robot 221 is to move. Processor 226 can send activation instructions to appropriate actuators 223 to cause body parts 222 to move as defined in a program.

In one aspect, humanoid robot 221 is an android.

Computer system 201 further includes robot programming module 211, simulation environment 212, training module 213, and gesture recognition system 217. Robot programming module 211 can be used to create programs for execution at humanoid robot 221, including programs to cause humanoid robot 211 to perform a gesture. Simulation environment 212 can use movement data captured at sensors 224 to simulate human performance of a gesture under different weather and landscape conditions and from different observation perspectives.

Sensors 202 include camera(s) 203, LIDAR sensor(s) 204, Radar sensor(s) 206, and ultrasound sensor(s) 207. Camera(s) 203, LIDAR sensor(s) 204, Radar sensor(s) 206, and ultrasound sensor(s) 207 can capture sensor data corresponding to the motions of humanoid robot 221 as parts of humanoid robot 221 move. Sensors 202 can capture images in different portions of the light spectrum including the visible light spectrum and the InfraRed (IR) spectrum.

Training module 213 includes training data set generator 214 and validator 216. Training data set generator 214 can generate training data used to train gesture recognition systems. Training data set generator 214 can generate training data from sensor data captured at sensors 202 and/or from virtual data observed in simulation environment 212. Validator 216 can validate the recognition capabilities of gesture recognition systems based on recognition results received from the gesture recognition systems.

Using training data, gesture recognition system 217 can be trained to recognize human performed gestures, such as, for example, hand and arm gestures performed in a roadway. Gesture recognition system 217 can submit recognition results to a validator for validation.

Figure 3:
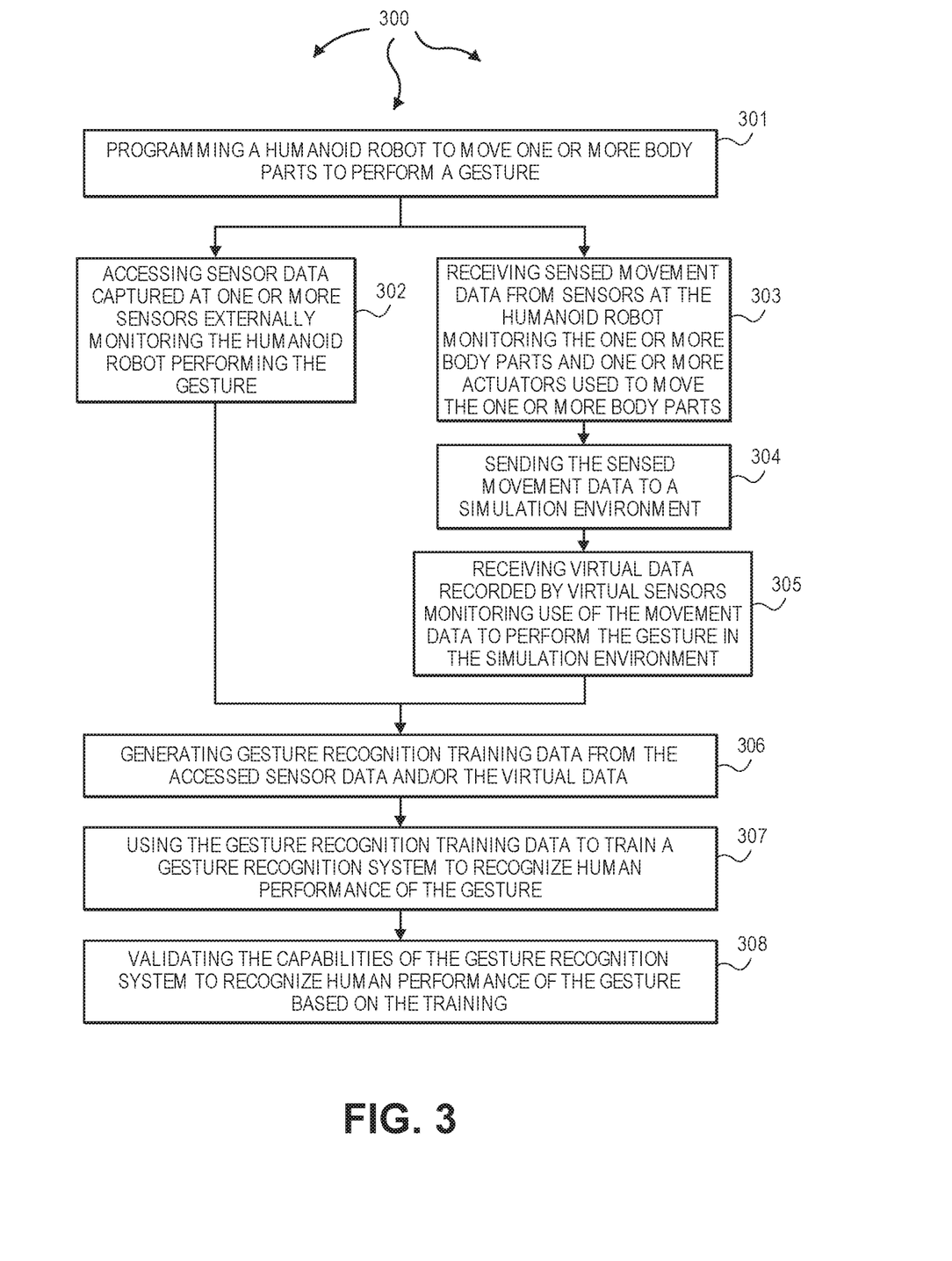
FIG. 3 illustrates a flow chart of an example method for validating gesture recognition capabilities of a gesture recognition system.

FIG. 3 illustrates a flow chart of an example method 300 for validating gesture recognition capabilities of a gesture recognition system. Method 300 will be described with respect to the components and data of computer architecture 200.

Method 300 includes programming a humanoid robot to move one or more body parts to perform a gesture (301). For example, robot programming module 211 can program humanoid robot 221 to perform gesture 231. Robot programming module 211 can generate a program for implementing gesture 231 automatically or a user of computer system 201 can interact with robot programming module 211 (e.g., through an integrated development environment (IDE)) to create the program. Computer system 201 can transfer the program to humanoid robot 221 via a wired and/or wireless network connection. Humanoid robot 221 can store the program in storage 227 (e.g., system memory, durable storage, etc.).

Processor 226 can access the program for implementing gesture 231 from storage 227. Based on contents of the program, processor 226 can send activation instruction(s) 232 to one or more actuators 223. Activation instruction(s) 232 activates the one or more actuators 223 to move one or more body parts 222 to perform gesture 231. For example, activation instruction(s) 232 can activate actuators 223 in an arm and hand of humanoid robot 221 to cause humanoid robot 221 to make a gesture for a right turn.

Method 300 includes accessing sensor data captured at one or more sensors externally monitoring the humanoid robot performing the gesture (302). For example, sensors 202 can monitor humanoid robot 221 and capture sensor data 234 while humanoid robot 221 performs gesture 231. Training module 213 can access sensor data 234 (e.g., directly from sensors 202 or from a storage location at computer system 201).

Method 300 includes receiving sensed movement data from sensors at the humanoid robot monitoring the one or more body parts and actuators used to move the one or more body parts (303). For example, sensors 224 (e.g., proprioceptive sensors) can monitor the one or more body parts 222 and one or more actuators 223 used to move the one or more body parts 222. Sensors 224 can sense movement data 233 (e.g., position, orientation, rotation, velocity, acceleration, etc.) of the one or more body parts 222 and one or more actuators 223 at specified time intervals while humanoid robot 221 performs gesture 231. Sensors 224 can give a direct readout from an actuator 223 controlling a joint of humanoid robot 221.

Humanoid robot 221 can send movement data 233 to computer system 201. Computer system 201 can receive movement data 233 from humanoid robot 221. Movement data 233 can be transferred from humanoid robot 221 to computer system 201 via a wired and/or wireless network connection. Movement data 223 can be stored in a storage device at computer system 201 and used for replaying performance of gesture 231.

Method 300 includes sending the sensed movement data to a simulation environment (304). For example, computer system 201 can send movement data 233 to simulation environment 212 (e.g., a gaming engine). Simulation environment 212 can use movement data 233 to simulate humans (e.g., animated actors) performing gesture 231. Simulation environment 212 can use movement data 233 to repeatedly simulate human performance of gesture 231 a plurality of times (e.g., hundreds, thousands, or even millions of times).

Each time human performance of the gesture is simulated, aspects of the simulation can be changed. For example, appearance of a simulated human can be changed, clothing of the simulated human can be changed, simulated weather conditions can be changed, a simulated location can be changed, a simulated landscape can be changed, etc. The perspective of observing the simulated human can also be changed. Observing the simulated human from different perspectives can lead to more robust and diverse training data since performance of a gesture can appear different from different viewing perspectives.

Virtual sensors (simulating one or more real world sensors) can be instantiated in simulation environment 212. The virtual sensors can monitor each simulated performance of gesture 231 and record virtual sensor data while simulations of gesture 231 are performed (similar to real-world capture of sensor data 234). Virtual sensor data recorded at virtual sensors for each simulated performance of gesture 231 can be combined into virtual data 236. Simulation engine 212 can send virtual data 236 to training module 213.

Method 300 includes receiving virtual data recorded by virtual sensors monitoring an animated actor that is actuated using the movement data to perform the gesture in the simulation environment (305). For example, training module 213 can receive virtual data 236 from simulation environment 212. In simulation environment 212, movement data 233 can be used to actuate performance of gesture 231 by an animated actor. Instantiated virtual sensors can monitor the animated actor and record virtual sensor data from the animated actor performing gesture 231. Simulation environment 212 can combine virtual sensor data from various virtual sensors into virtual data 236 and can send virtual data 236 to training module 213.

Method 300 includes generating gesture recognition training data from the accessed sensor data and/or the virtual data (306). For example, training data set generator 214 can generate training data 237 from sensor data 234 and/or virtual data 236. Generating training data 237 from both sensor data 234 and virtual data 236 improves both the quality and quantity of data used to generate training data 237.

Gesture programming module 211 can also indicate gesture 231 to training module 213. Training module 213 can associate gesture 231 with sensor data 234, virtual data 236, and training data 237 based on humanoid robot 221's performance of gesture 231.

Method 300 includes using the gesture recognition training data to train a gesture recognition system to recognize human performance of the gesture (307). For example, training module 213 can use training data 237 to train gesture recognition system 217 (e.g., a gesture recognition system for an automated vehicle) to recognize a human performing gesture 231.

Method 300 includes validating the capabilities of the gesture recognition system to recognize human performance of the gesture based on the training (308). For example, during and/or after training, gesture recognition system 217 can attempt to recognize human performance of gesture 231 from the behaviors of one or more humans. The outcomes of attempting to recognize human performance of gesture 231 can be indicated in recognition results 238. Gesture recognition system 217 can send recognition results 238 to validator 216. Validator 216 can receive recognition results 238 from gesture recognition system 217. Validator 216 can validate the recognition capabilities of gesture recognition system 217 based on recognition results 238.

When recognition capabilities of gesture recognition system 217 are insufficient, gesture recognition system 217 can undergo further training. In one aspect, additional training includes further training using training data set 237. In another aspect, humanoid robot 221 can be programmed to perform additional iterations of gesture 231. Additional performances of gesture 231 can also be simulated in simulation environment 212 using movement data 223 and/or movement data acquired from the additional iterations of humanoid robot 221.

Additional sensor data and/or virtual data from the additional iterations and/or additional simulations respectively can be used to generate additional training data. The additional training data can be used to further train gesture recognition system 217 to recognize human performance of gesture 231. Validator 216 can again validate the recognition capabilities of gesture recognition system 217 based on further recognition results. Training can continue until recognition capabilities of gesture recognition system 217 are validated as sufficient for recognizing human performance of gesture 231.

In some aspects, humanoid robot 221 is programmed to repeatedly perform gesture 231 on an ongoing basis (e.g., hundreds, thousands, or even millions of times). Sensors 202 can capture sensor data for each performance of gesture 231. The position of sensors 202 and humanoid robot 221 relative to one another can be also be varied (e.g., directions, distances, etc. can be changed). Changing relative locations allows sensors 202 to obtain sensor data for performances of gesture 231 from different perspectives. Sensing data from different perspectives can lead to more robust and diverse training data since performance of a gesture can appear different from different viewing perspectives. Different sensors 202 can also be positioned in different locations relative to humanoid robot. Positioning different sensors 202 in different locations allows sensors 202 to essentially simultaneously capture sensor data from different perspectives for the same performance of gesture 231.

The surroundings of humanoid robot 221 can also be varied, such as, for example, between mock ups of a parking lot, intersection, crosswalk, etc. Humanoid robot 221 can also be physically transported to different locations, such as, for example, to actual intersections, crosswalks, or parking lots. Humanoid robot 221 can be programmed to (possibly repeatedly) perform gesture 231 in each different mockup and/or in each different physical location. Sensors 202 can monitor performance of gesture 231 in each different mockup and/or in each different physical location. In some aspects, humanoid robot 221 and sensors 202 are positioned by the side of a road.

Similarly, an animated human can be programmed to repeatedly perform gesture 231 on an ongoing basis (e.g., hundreds, thousands, or even millions of times) in simulation environment 212. Virtual sensors (simulating real world sensors) can capture virtual sensor data for each performance of gesture 231. The position of the virtual sensors and the animated human relative to one another can be also be varied (e.g., directions, distances, etc. can be changed). Changing relative locations allows the virtual sensors to obtain virtual sensor data for performances of gesture 231 from different perspectives. Sensing virtual data from different perspectives can lead to more robust and diverse training data since performance of a gesture can appear different from different viewing perspectives. Different types of virtual sensors (simulating different types of real world sensors) can also be positioned in different locations relative to the animated human. Positioning different types of virtual sensors in different locations allows the virtual sensors to essentially simultaneously capture different types of virtual sensor data from different perspectives for the same performance of gesture 231.

The virtual surroundings of the animated human can also be varied, such as, for example, between mock ups of a parking lot, intersection, crosswalk, etc. The animated human can be programmed to (possibly repeatedly) perform gesture 231 in each different virtual surrounding. The virtual sensors can monitor performance of gesture 231 in each different virtual surrounding. In some aspects, the animated human and virtual sensors are simulated to be by the side of a road, in a passing vehicle, etc.

Figure 4:
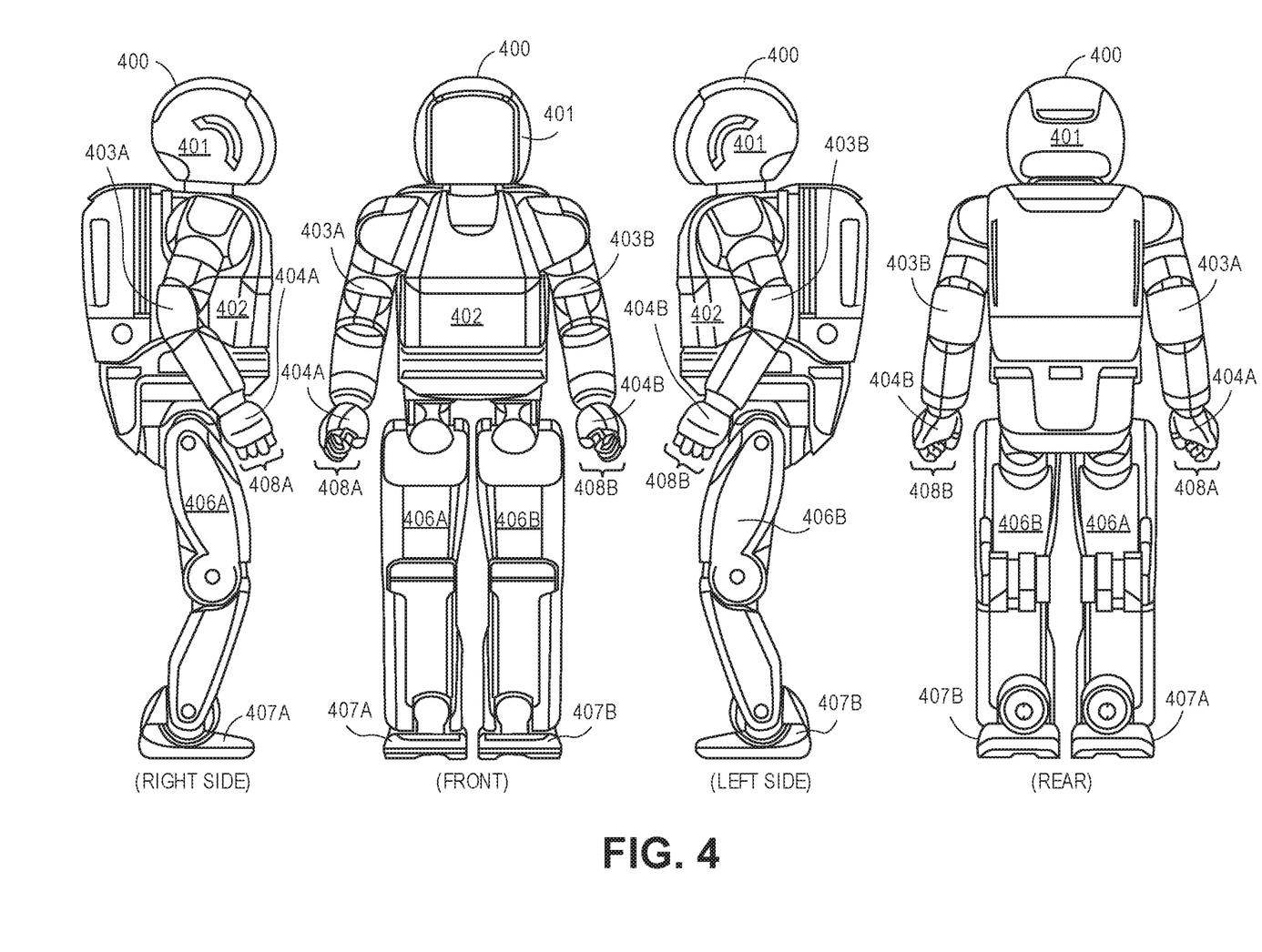
FIG. 4 illustrates an example of different views of a humanoid robot.

FIG. 4 illustrates an example of different views of a humanoid robot 400. Humanoid robot 400 includes various body parts, including: head 401, torso 402, arm 403A, arm 403B, hand 404A, hand 404B, fingers 408A, fingers 408B, leg 406A, leg 406B, foot 407A, and foot 408B. Robot 400 can also include a processor, storage, actuators, and sensors. The processor can access a program for implementing a gesture from the storage. The processor can execute the program to send activation instructions to actuators of specified body parts to cause the specified body parts to move in a manner that implements the gesture. Proprioceptive sensors can monitor the body parts and the actuators during movement to capture movement data, including joint and posture positions. The proprioceptive sensors can send the movement data to a computer system for use in a simulation environment.

In other aspects, a humanoid robot can be an android including components similar to humanoid robot 400 and having various body parts aesthetically resembling a human.

Figure 5:
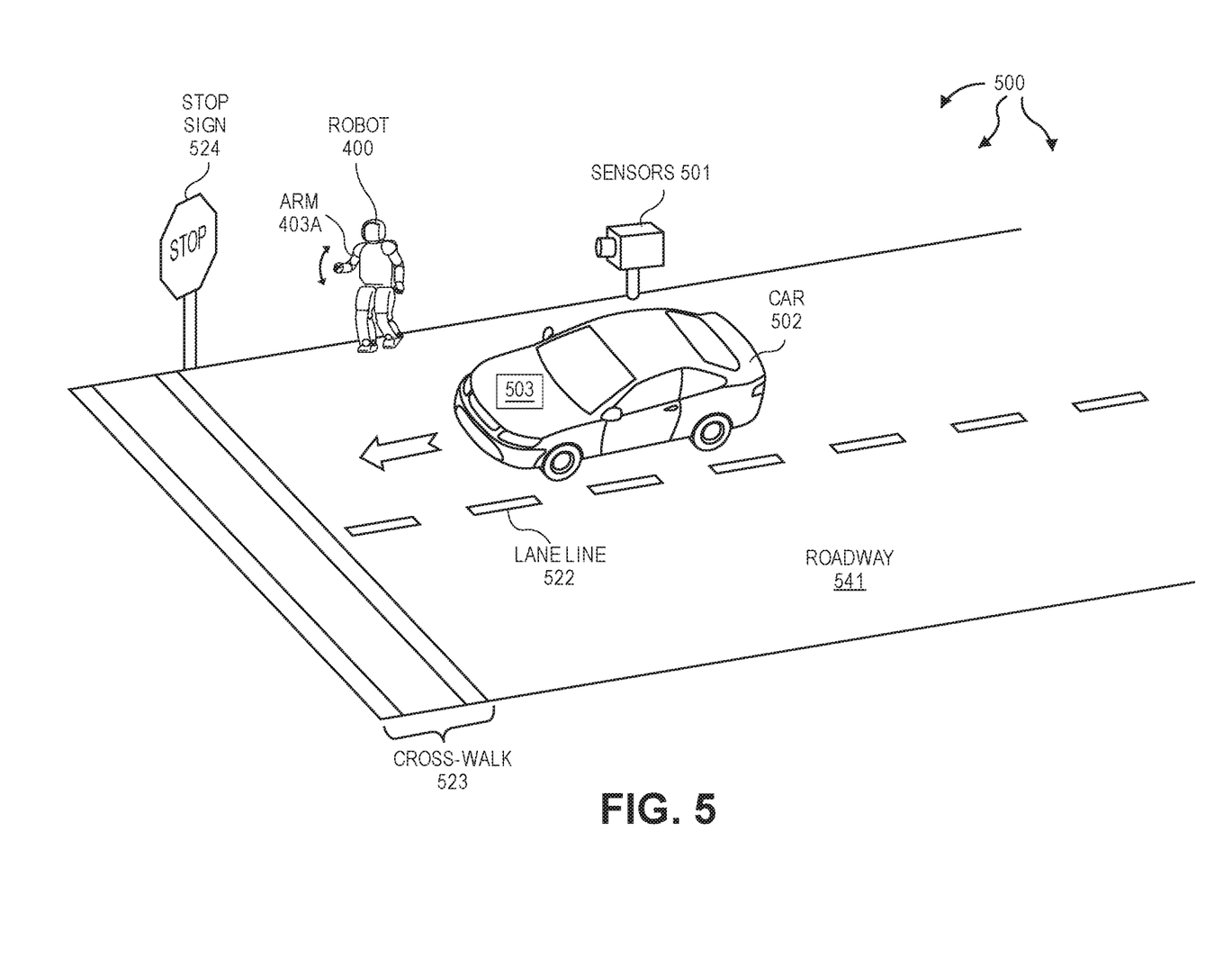
FIG. 5 illustrates a humanoid robot performing a gesture in a roadway environment.

FIG. 5 illustrates humanoid robot 400 performing a gesture in roadway environment 500. Roadway environment 500 includes roadway 541. Lane lines 522 separate the lanes of roadway 541. As depicted, car 502 (possibly an autonomous vehicle) is approaching stop sign 524 and cross-walk 523. Robot 400 is (possibly repeatedly) making a "slow down" gesture by moving arm 403A essentially vertically up and down.

Sensors 501 and/or sensors 503 (e.g., one or more cameras, LIDAR sensors, Radar sensors, ultrasound sensors, etc.) are monitoring robot 400. Sensors 501 and/or sensors 503 can capture sensor data as robot 400 performs the "slow down" gesture. Sensor data captured by sensors 501 and/or sensors 503, as well as movement data monitored at sensors integrated in robot 400, can be sent wirelessly to a computer system that generates training data for gesture recognition systems. Alternately or in combination, captured sensor data can be stored at a computer system local to sensors 501 and/or at an on-board computer system integrated into car 502.

Accordingly, aspects of the invention provide a cost-effective, efficient mechanism to generate gesture data and train and validate gesture recognition systems that is easily scalable compared to hiring human actors. The use of a humanoid robot allows for direct readout of the humanoid robot's joint positions and orientations which can then be used to program joints/posture of simulated (animated) actors. Use of a humanoid robot also increases consistency of performing gestures relative to a human actor, since the humanoid robot does not tire and is not error-prone In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, gesture programs, activation instruction(s), movement data, sensor data, virtual data, gestures, training data, recognition results, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, gesture programs, activation instruction(s), movement data, sensor data, virtual data, gestures, training data, recognition results, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed:

1. A method comprising:
    programming a humanoid robot to move a body part to perform a gesture;
    capturing sensor data from one or more sensors externally monitoring the humanoid robot performing the gesture;
    receiving sensed movement data from one or more other sensors attached to the humanoid robot monitoring the humanoid robot performing the gesture;
    using the sensed movement data to actuate a simulated human animated actor's performance of the gesture in a simulated roadway environment;
    receiving virtual data recorded by virtual sensors in the simulated roadway environment monitoring the simulated human animated actor in the simulated roadway environment;
    generating gesture recognition training data from the captured sensor data and the received virtual data; and
    using the gesture recognition training data to train a gesture recognition system to recognize a human performing the gesture.

2. The method of claim 1, wherein capturing sensor data from one or more sensors monitoring the humanoid robot comprises capturing sensor data from one or more sensors monitoring the humanoid robot in a roadway environment.

3. The method of claim 1, wherein programming a humanoid robot to move a body part to perform a gesture comprises programming a humanoid robot to move a hand or an arm.

4. The method of claim 1, wherein programming a humanoid robot to move a body part to perform a gesture comprises programming the humanoid robot to perform the gesture a plurality of times; and
    wherein capturing sensor data comprises capturing sensor data as the humanoid robot performs the gesture the plurality of times.

5. The method of claim 1, wherein capturing sensor data from one or more sensors comprises capturing sensor data from one or more of: a camera, a LIDAR sensor, or a Radar sensor.

6. The method of claim 1, wherein using the gesture recognition training data to train a gesture recognition system comprises using the gesture recognition training data to train an automated vehicle gesture recognition system.

7. A method for generating gesture recognition training data, the method comprising:
    programming a humanoid robot to move a plurality of body parts to perform a roadway gesture;
    capturing sensor data from one or more external sensors monitoring the humanoid robot performing the roadway gesture;
    receiving sensed movement data from one or more other sensors attached to the humanoid robot monitoring the humanoid robot performing the gesture;
    actuating performance of the roadway gesture in a simulated roadway environment by a simulated human animated actor in the simulated roadway environment based on the sensed movement data, the simulated roadway environment simulating a specified real-world roadway context;
    receiving virtual data recorded by virtual sensors in the simulated roadway environment monitoring the simulated human animated actor in the simulated roadway environment;
    generating gesture recognition training data from the captured sensor data and the received virtual data; and
    using the gesture recognition training data to train a gesture recognition system to recognize a human performing the roadway gesture in the specified real-world roadway context.

8. The method of claim 7,
    wherein receiving the sensed movement data comprises receiving the sensed movement data from the one or more other sensors monitoring the plurality of body parts and a plurality of actuators used to move the plurality of body parts; and
    further comprising sending the sensed movement data to the simulated roadway environment.

9. The method of claim 8, wherein receiving virtual data comprises receiving virtual data generated using a plurality of different weather conditions in the simulated roadway environment.

10. The method of claim 8, wherein receiving virtual data comprises receiving virtual data generated using a plurality of simulated humans to perform the gesture in the simulated roadway environment, each of the plurality of simulated humans having different physical characteristics and wearing different clothes.

11. The method of claim 8, wherein receiving virtual data comprises receiving virtual data generated using a plurality of different landscapes in the simulated roadway environment.

12. The method of claim 8, wherein receiving the sensed movement data comprises receiving sensed moment data that indicates joint positions and posture at the humanoid robot.

13. The method of claim 7, wherein programming a humanoid robot to move a plurality of body parts to perform a roadway gesture comprises programming a humanoid robot to perform a roadway gesture selected from among:
  signaling a vehicle to open a trunk of the vehicle;
  signaling a car to stop or keeping moving at a crosswalk;
  signaling traffic to stop at an intersection; or
  signaling a turn.

14. The method of claim 7, wherein capturing sensor data from one or more sensors comprises capturing sensor data from one or more of: a camera, a LIDAR sensor, or a Radar sensor externally monitoring the humanoid robot.

15. The method of claim 7, further comprising:
  receiving recognition results from the gesture recognition system, the recognition results indicating outcomes of attempting to recognize human performance of the gesture in the roadway context; and
  validating the recognition capabilities of the gesture recognition system based on the recognition results.

16. A computer system, the computer system comprising:
  a processor; and
  system memory coupled to the processor and storing instructions configured to cause the processor to:
    program a humanoid robot to move a plurality of body parts and actuators to perform a roadway gesture;
    capture sensor data from one or more sensors monitoring the humanoid robot performing the roadway gesture;
    receive sensed movement data from one or more other sensors attached to the humanoid robot monitoring the humanoid robot performing the gesture;
    actuate a simulated human animated actor to perform the roadway gesture in a simulated roadway environment based on the sensed movement data, the simulated roadway environment simulating a roadway context;
    receive virtual data recorded by virtual sensors monitoring the simulated human animated actor in the simulated roadway environment;
    generate gesture recognition training data from the captured sensor data and the received virtual data; and
    use the gesture recognition training data to train a gesture recognition system to recognize a human performing the roadway gesture in the roadway context.

17. The computer system of claim 16,
  wherein instructions configured to receive the sensed movement data comprise instructions configured to receive the sensed movement data from the one or more other sensors monitoring the plurality of body parts and the actuators, the sensed movement data indicating position, speed, and acceleration of each of the plurality of body parts at different times during performance of the roadway gesture; and
  further comprising instructions configured to cause the processor to send the sensed movement data to simulated roadway environment.

18. The computer system of claim 16, wherein instructions configured to cause the processor to program a humanoid robot to move a plurality of body parts comprise instructions configured to cause the processor to program a humanoid robot to move two or more of: an arm, a leg, a hand, or a head.

19. The computer system of claim 16, wherein instructions configured to cause the processor to use the gesture recognition training data to train a gesture recognition system comprise instructions configured to cause the processor to use the gesture recognition training data to train an automated vehicle gesture recognition system.

* * * * *